United States Patent [19]

Kwong et al.

[11] Patent Number: 4,762,394
[45] Date of Patent: Aug. 9, 1988

[54] REAL TIME OPTICAL COMPUTING AND IMAGE PROCESSING USING SELF-PUMPED CONJUGATE MIRROR

[75] Inventors: Sze-Keung Kwong, Pasadena; George A. Rakuljic, Santa Monica; Victor Leyva, Alhambra; Amnon Yariv, San Marino, all of Calif.

[73] Assignee: California Institute of Technology, Pasadena, Calif.

[21] Appl. No.: 874,565

[22] Filed: Jun. 16, 1986

[51] Int. Cl.$^4$ .......................... G02B 5/23; G02B 1/01; G02B 27/14; G02B 5/30
[52] U.S. Cl. .................................. 350/171; 350/173; 350/174; 350/354; 350/385; 350/393
[58] Field of Search ............... 350/354, 385, 393, 171, 350/173, 174

[56] References Cited

U.S. PATENT DOCUMENTS 4,632,518  12/1986  Jensen ................................. 350/354

OTHER PUBLICATIONS

Jeffrey O. White and Amnon Yariv, "Real-Time Image Processing via Four-Wave Mixing in a Photorefractive Medium", Appl. Phys. Lett., vol. 37, No. 1, Jul. 1980, pp. 6–8.
Jack Feinberg, "Real-Time Edge Enhancement Using the Photorefractive Effect," Optics Letters, vol. 5, No. 8, Aug. 1980, pp. 330–332.
Y. H. Ja, "Real-Time Image Subtraction in Four-Wave Mixing with Photorefractive $Bi_{12}GeO_{20}$ Crystals", Opt. Comm., vol. 42, No. 6, 15 Aug. 1982, pp. 337–380.
E. Ochoa, L. Hesselink, & J. Goodman, "Real-Time Intensity Inversion Using Two-Wave and Four-Wave Mixing in Photorefractive $Bi_{12}GEO_{20}$," Appl. Optics, vol. 24, No. 12, 15 Jun. 1985, pp. 1826–1832.
Y. H. Ja, "Real-Time Optical Image Differentiation by Degenerate Four-Wave Mixing," Appl. Phys. B, vol. 36, 1985, pp. 21–24.
M. Ewbank, P. Yah, M. Khoshnevisan & J. Feinberg, "Time Reversal by an Interferometer with Coupled Phase-Conjugate Reflectors," Optics Letters, vol. 10, No. 6, Jun. 1985, pp. 282–284.
A. Chiou and P. Yeh, "Parallel Image Subtraction Using a Phase-Conjugate Michelson Interferometer," Optics Letters, vol. 11, No. 5, May 1986, pp. 306–308.

Primary Examiner—Eugene R. LaRoche
Assistant Examiner—Michael B. Shingleton
Attorney, Agent, or Firm—Freilich, Hornbaker, Rosen & Fernandez

[57] ABSTRACT

Real time "exclusive or" operation, image subtraction, intensity inversion, and first- and second-order differentiation is achieved by an interferometer with a phase conjugate mirror for retroreflection of two or more beams derived from a single beam by a beam splitter and recombined interferometrically by the beam splitter.

7 Claims, 7 Drawing Sheets (b)

(a)

(c)

(d)

(a)

(b)

(c)

(d)

REAL TIME OPTICAL COMPUTING AND IMAGE PROCESSING USING SELF-PUMPED CONJUGATE MIRROR

ORIGIN OF INVENTION

The invention described herein was sponsored by the U.S. Army Research Office under Contract No. DAAG 29-83-K-0048 and under ONR Contract No. N00014-82-C-2466.

BACKGROUND OF THE INVENTION

This invention relates to a method and apparatus for real time optical image processing, i.e., for computing and processing images utilizing a passive phase conjugate mirror.

There has been a growing interest in real-time optical image processing for convolving and correlating objects with spatial information, performing inversion of gray-scale objects, subtraction, and differentiation. In recent years, photorefractive crystals have been used to perform such real-time image processing operations. For example, real-time convolution and correlation have been demonstrated by J. O. White and A. Yariv, "Real-time image processing via four-wave mixing in a photorefractive medium," Appl. Phys. Lett., Vol. 37, pp 5–7 (1980). Edge enhancement has been reported by J. Feinberg, "Realtime edge enhancement using photorefractive effect," Opt. Lett., Vol. 5, pp 330–332 (1980). Work related to image subtraction has also been reported by J. P. Huignard, J. P. Herrian, and F. Micherson, "Coherent selective erasure of superimposed volume holograms in $LiNbO_3$," Appl. Phys. Lett., Vol. 26, pp 225–258 (1975) and by Y. H. Ja, "Real-time image subtraction in four-wave mixing with photorefractive $Bi_{12}GeO_{20}$ crystal," Opt. Comm., Vol. 42, pp 377–388 (1982). The latter employed two sequential exposures of the hologram and was thus not strictly real-time. Differentiation, division and inversion have also been reported by Y. H. Ja., "Real-time optical image differentiation by degenerate four-wave mixing," Appl. Phys. B., Vol. 36 pp 21–24 (1985), "Real-time image division in four-wave mixing with photorefractive $Bi_{12}GeO_{20}$ crystal, " Opt. Comm., Vol. 44, pp 24–28 (1982), and E. Ochoa, et al., "Real-time intensity inversion using two waves and four-wave mixing in photorefractive $Bi_{12}GeO_{20}$," Appl. Opt., Vol. 24, pp 1826–32 (1985), respectively. An object of this invention is to provide simple, exact and high performance optical systems for real-time image processing utilizing a passive (self-pumped) phase conjugate mirror which reflects back through the medium a coherent beam on the axis of the incident beam, as disclosed in U.S. Pat. No. 4,529,273.

SUMMARY OF THE INVENTION

In accordance with this invention, a passive phase conjugate mirror (PPCM) is employed to reflect two coherent beams derived from a laser by a beam splitter back on their respective axis. Each beam is directed to the PPCM through separate transparencies by a properly positioned mirror for each beam. Since the beams pass through the beam splitter to be transmitted and reflected, but in reverse order, a phase inversion occurs between them due to the time reversibility of light. Upon being recombined interferometrically at the beam splitter, the coherent reflected beams produce an output beam incident on an image detector. The image of that output beam is the "exclusive or" of the images of the two transparencies, thus producing as an output image only the differences between the images of the two transparencies. Image inversion may also be achieved by placing a transparency of the image in one beam path and leaving the second beam path clear. In a similar arrangement, a beam splitter is used to provide two intersecting coherent beams, and a single transparency is placed at some small distance from the intersection such that each beam reads a slightly shifted image of the other. The phase locked conjugate images are recombined at the beam splitter to provide an output beam proportional to the first order differential. Second order image differentiation is implemented in a similar way, but using a second beam splitter to provide a third coherent beam intersecting with the other two at the same point. The third beam is opposite the second beam with respect to the first so that the beams read $T(x,y)$, $T(x+\Delta x,y)$ and $T(x-\Delta,y)$. The reflectivity of the second beam splitter positioned between the first beam splitter and the intersection point is 50%, giving an output amplitude proportional to the second order image differential at the output of the first beam splitter.

BRIEF DESCRIPTION OF THE DRAWINGS

FIGS. 3a and 3b are the phase conjugate images of uniform illumination and a resolution chart, respectively. FIG. 3c is the intensity inverted image detected by detector $D_1$, and FIG. 3d is the image addition observed by detector $D_2$, which is proportional to $[3+|T_1|^2]^2$.

The novel features that are considered characteristic of this invention are set forth with particularity in the appended claims. The invention will best be understood from the following description when read in connection with the accompanying drawings.

DESCRIPTION OF PREFERRED EMBODIMENTS

Image Subtraction

Figure 1:
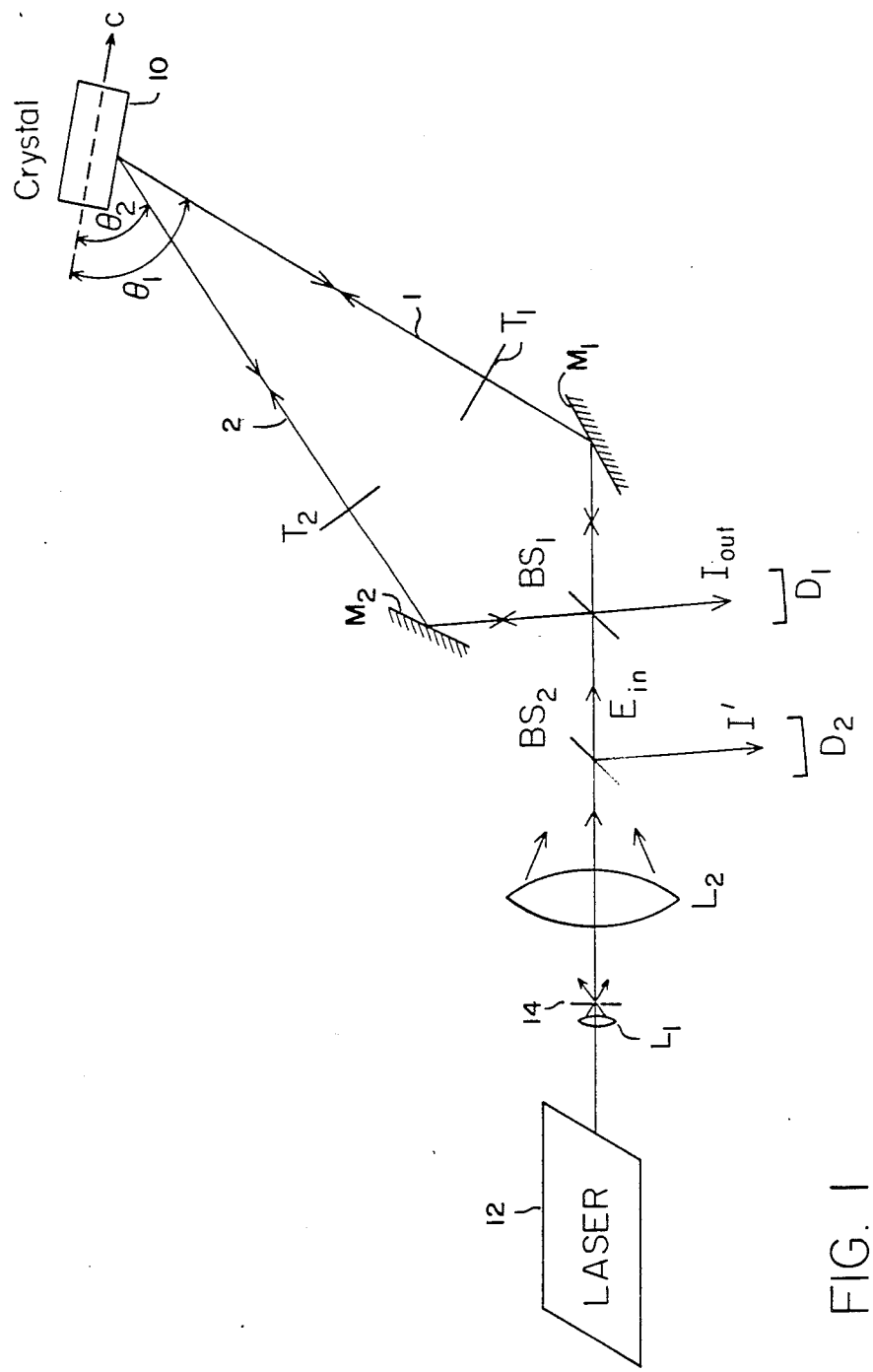
FIG. 1 illustrates schematically an arrangement utilizing a passive phase conjugate mirror (PPCM) to obtain the "exclusive-or" (difference) between two image transparencies $T_1$ and $T_2$. With only one transparency $T_1$ or $T_2$ in place, the arrangement performs an inversion operation of the one image.
Figure 1A:
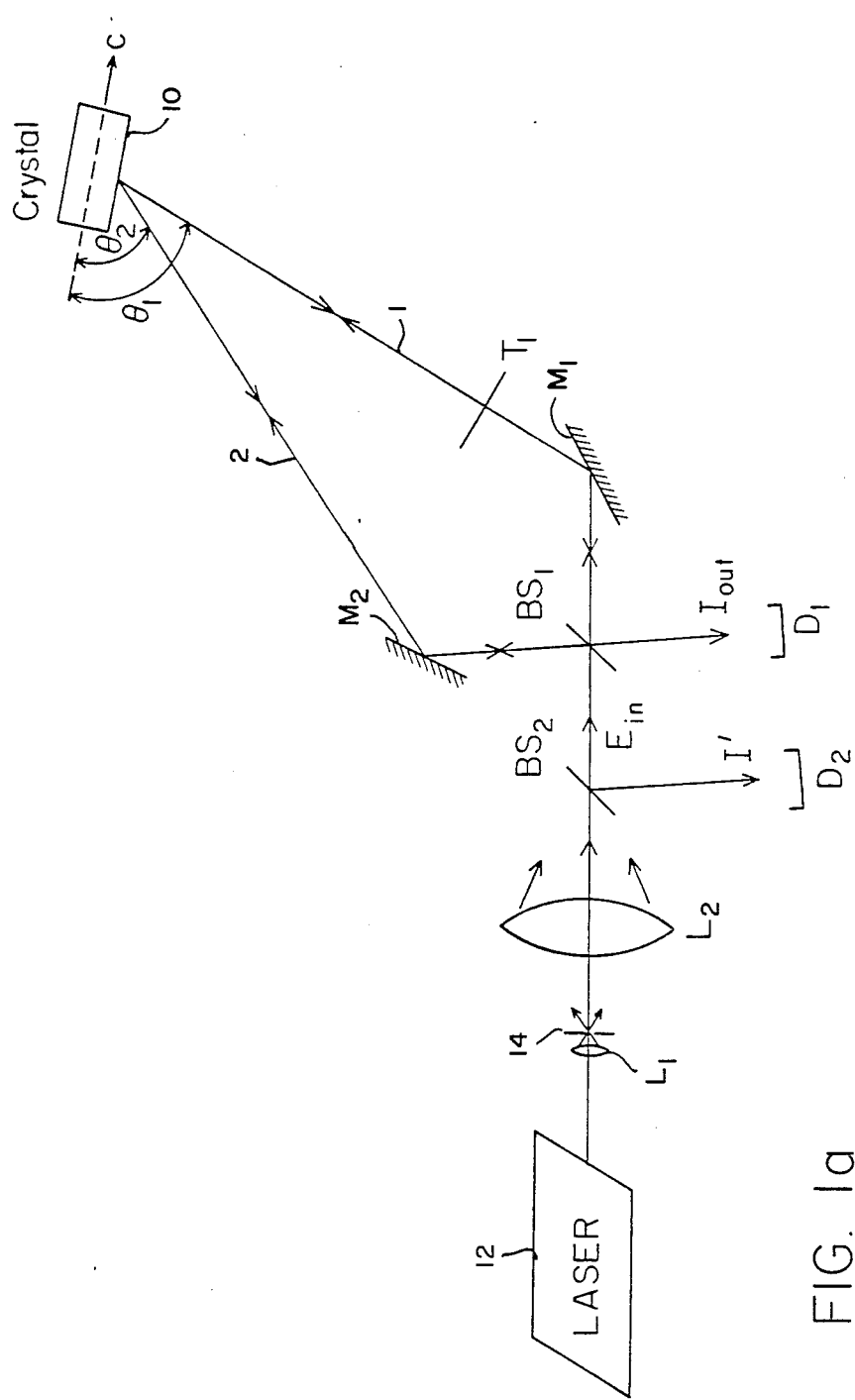
FIG. 1a illustrates the arrangement for performing an inversion operation achieved by setting $|T_2|^2=1$, thus effectively removing transparency $T_2$ in FIG. 1.

Referring to FIG. 1, a real time image subtraction, hereinafter referred to as "exclusive or" operation, is obtained with an interferometer arrangement using a passive phase conjugate mirror (PPCM) 10. A wave with amplitude $E_{in}$ is divided by beam splitter $BS_1$ whose reflection and transmission coefficients are equal to r and t, respectively, but are applied to the split beams transmitted to and retroreflected from the PPCM in reverse order, namely, first t and then r for beam 1, and first r and then t for beam 2. The two beams are passed through respective transparencies 11 and 12 with amplitude transmittance $T_1$ for beam 1 and $T_2$ for beam 2. Both beams 1 and 2 are retroreflected by the PPCM with phase conjugate reflectivities $R_1$ and $R_2$, respectively. ($R_1$ and $R_2$ are in general not the same.)

The reflected beams recombine interferometrically at beam splitter $BS_1$ to form an output field intensity $I_{out}$ at a detector $D_1$ given by $$I_{out}=[r't^*R_1|T_1|^2+tr^*R_2|T_2|^2]^2I_{in} \quad (1)$$

where $I_{in}=|E_{in}|^2$.

From Stokes' principle of the time reversibility of light $$r't^*+r^*t=0 \quad (2)$$

so that $$I_{out}=[R_1|T_1|^2-R_2|T_2|^2]^2|r^*t|^2 I_{in} \quad (3)$$

If the two phase conjugate mirrors are identical, i.e., $R_1=R_2=R$, then in practice only one crystal is required to serve the function of two phase conjugate mirrors $$I_{out}=[|T_1|^2-|T_2|^2]^2|rt^*R|^2I_{in} \quad (4)$$

$$I_{out} \propto |T|^2 \oplus |T|^2 \quad (5)$$

where $\oplus$ represents the Boolean "exclusive or" operation. Similarly, the field intensity I' measured by detector $D_2$ is $$I' \propto [|T_1|^2+|r|^2(|T_2|^2-|T_1|^2)]^2|R|^2 I_{in} \quad (6)$$

Note that the $\pi$ phase shift between the complex fields of the two is introduced naturally by the principle of time reversibility of light, which for this invention provides that if the sequence of reflection (R) and transmission (T) for the two beams is reversed, the phase of one beam will be inverted relative to the other. This is an essential difference between this method and other methods by Ja (*Opt. Comm.* 42, 377, 1982) and others in which the $\pi$ phase shift is artificially provided by a piezoelectric mirror or an electro-optical modulator. The arrangement of the present invention is thus only sensitive to intensity differences of the two transparencies and is independent of the phase information of the transparencies or the optical path lengths of the two arms. This is because each beam is retroreflected without any phase shift between the incident beam and the reflected beam. Consequently, at the beam splitter the beams are in phase regardless of any difference in path lengths for the two beams. This makes the system accurate and simple because there are no critical adjustments to be made as to the positions of the components.

In the experimental arrangement shown in FIG. 1, a single $TEM_{00}$ mode Argon laser 12 produced a beam (5145 A, 50 mW) that was expanded by a lens $L_1$ and aperture 14, and split into two beams (1 and 2) by 50% beam splitter $BS_1$. Each beam was then reflected by mirrors $M_1$ and $M_2$ to pass through separte transparencies $T_1$ and $T_2$ to the PPCM comprised of a poled $BaTiO_3$ crystal. A lens $L_2$ (f=30 cm) was used to focus the two expanded beams which were adjusted to overlap completely inside thew poled $BaTiO_3$ crystal. The crystal was aligned to form the passive (self-pumped) phase conjugate mirror 10 by setting the angles between the beams and the crystal C-axis to $\theta_1=50°$ and $\theta_2=40°$.

The two image bearing beams were phase conjugated simultaneously with no cross talk. The magnitude of the phase conjugate reflectivities of beam 1 and beam 2 were approximately the same and equal to 25%. The phases of the complex phase conjugate reflections coefficients of the two beams are also the same. Since the PPCM regards the combination of the two input beams as a single complex input wave, and due to the beams' overlap in the crystal they are both reflected from the same set of gratings. (Another method for obtaining phase locking between the two phase conjugate beams is described by M. D. Eubank, et al., *Opt. Lett.* 10, 282 (1985), in which a self-induced oscillation locks the relative phase between the two phase conjugate beams.) The phase conjugate reflected image bearing beams were then combined interferometrically at beam splitter $BS_1$. The two transparencies and the detectors were placed close to the beam splitters to reduce diffraction aberration.

Figure 2:
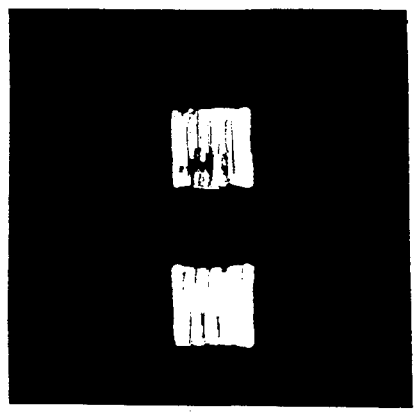
FIG. 2a illustrates the image on a transparency $T_1$ of a colon after phase conjugation and FIG. 2b illustrates the image on a transparency $T_2$ of a semicolon after phase conjugation.
FIG. 2c then illustrates the "exclusive-or," i.e., image difference $(T_2-T_1)$ between transparencies.
FIG. 2d illustrates the image output of the second detector $D_2$ downstream from the recombining beam splitter in the path of the incident beam. That image is proportional to the sum of the intensities $[|T_1|^2+|T_2|]^2$ when the square of the coefficient of reflection of the beam splitters is 0.5.
Figure 2:
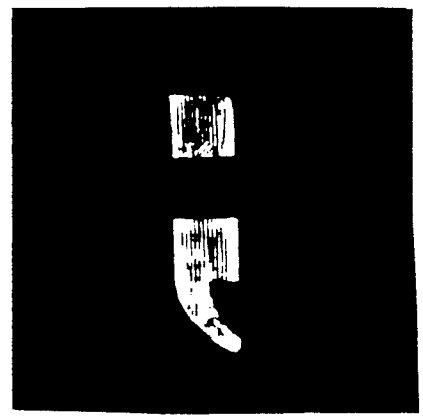
Figure 2:
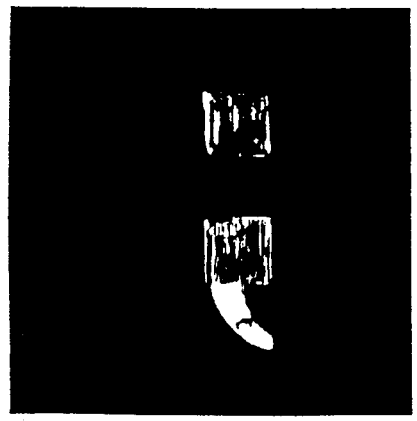
Figure 2:
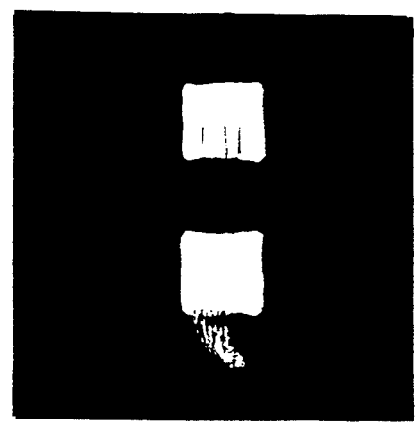

The transparencies $T_1$ and $T_2$ used in the experiment were pictures of a colon and a semicolon respectively. The phase conjugate images of these two transparencies are shown in FIGS. 2a and 2b, respectively. FIG. 2c is the image detected by detector $D_1$, which represents the "exclusive or" operation between the two images, $|T_1|^2 \oplus |T_2|^2$. FIG. 2d is the image recorded by detector $D_2$, which represents $[|T_1|^2+|r|^2(|T_2|^2-|T_1|^2)]^2$ and it is proportional to the sum of intensities, $[|T_1|^2+|T_2|^2]^2$, when $|r|^2=0.5$. Slight edge enhancement effects were also observed in these figures which are probably due to large object beam intensities as compared to the weaker pump beam intensities. These results are independent of the optical path lengths of either beam between the beam splitter $BS_1$ and the PPCM crystal.

The response time of the PPCM obeyed approximately the relation $\tau \sim 10/I$ where I is the total intensity of the interaction beams in $mW/mm^2$.

Intensity Inversion

Figure 3:
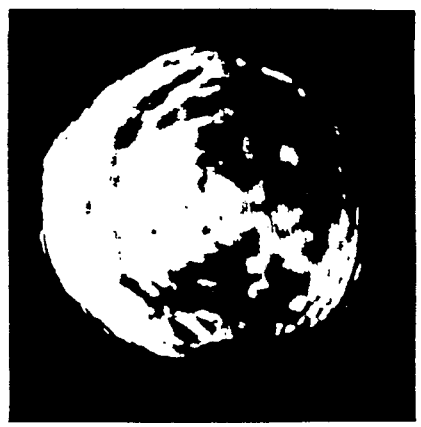
FIGS. 3a through d illustrate intensity inversion achieved by effectively removing transparency $T_2$ in FIG. 1 by setting $|T_2|^2=1$.
Figure 3:
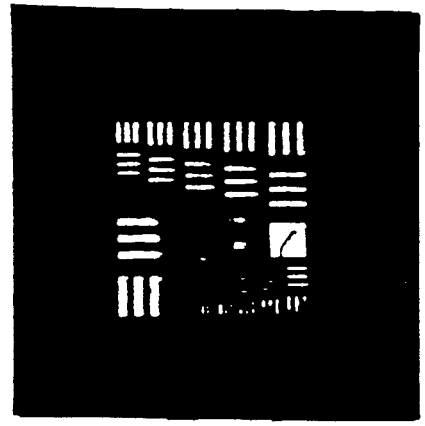
Figure 3:
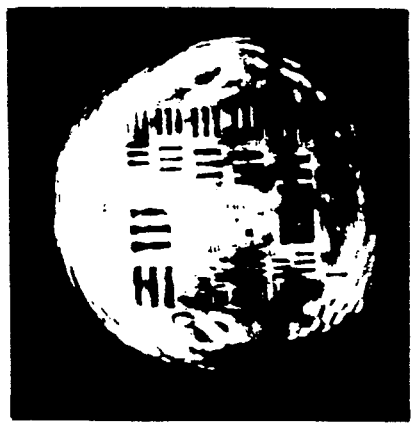
Figure 3:
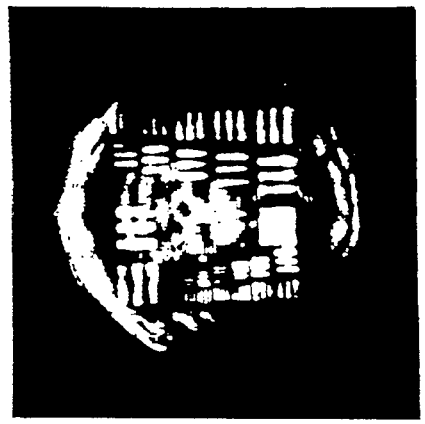

Optical intensity inversion was also observed by simply removing transparency $T_2$, i.e., making $T_2=1$, so that the intensity detected by detector $D_1$ is proportional to $[1-|T_1|^2]$ which result follows from Equation (3) when $|T_2|^2=1$. FIGS. 3a and 3b are the phase conjugate images of a uniform illumination and a resolution chart, respectively. FIG. 3c is the intensity inverted image detected by detector $D_1$. FIG. 3d is the image addition observed by detector $D_2$, which is proportional to $[1+|T_1|^2]^2$.

Intensity inversion by a different method which uses four wave mixing was reported by Ochoa, et al., *Appl. Opt.*, supra. In their method, the object beam intensity is required to be much larger than that of the reference beam in order to ensure that the diffraction efficiency of the index grating is inversely proportional to the object beam intensity.

Image Differentiation

Differentiation of a function $I(x,y)$ can be approximated to any degree of accuracy by using finite differences. Using such a method, the first and second-order differentials are given by $$\frac{\partial I(x,y)}{\partial x} = \frac{I(x+\Delta x,y) - I(x,y)}{\Delta x} \quad (7)$$

$$\frac{\partial^2 I(x,y)}{\partial x^2} = \frac{I(x+\Delta x,y) - 2I(x,y) + I(x-\Delta x,y)}{(\Delta x)^2} \quad (8)$$

Therefore, the differential of any order can be obtained by adding and subtracting various shifted images of a pattern function.

Figure 4:
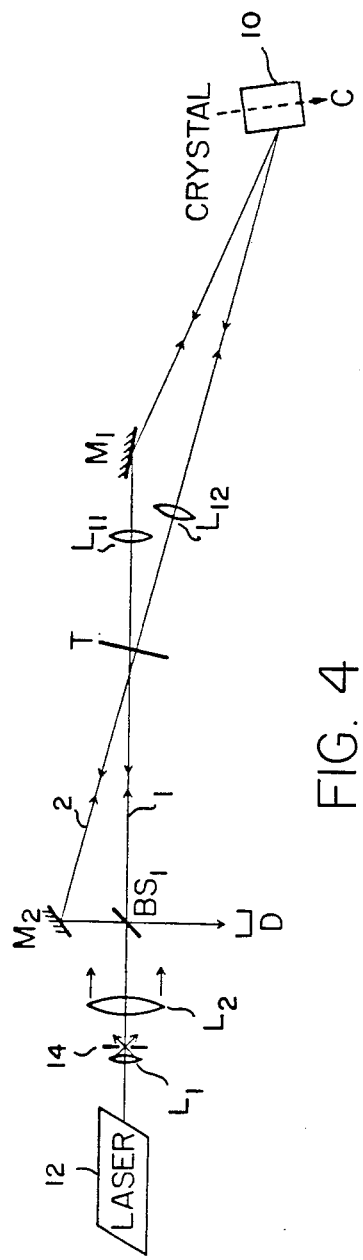
FIG. 4 illustrates an arrangement for first order image differentiation utilizing a PPCM.
Figure 5:
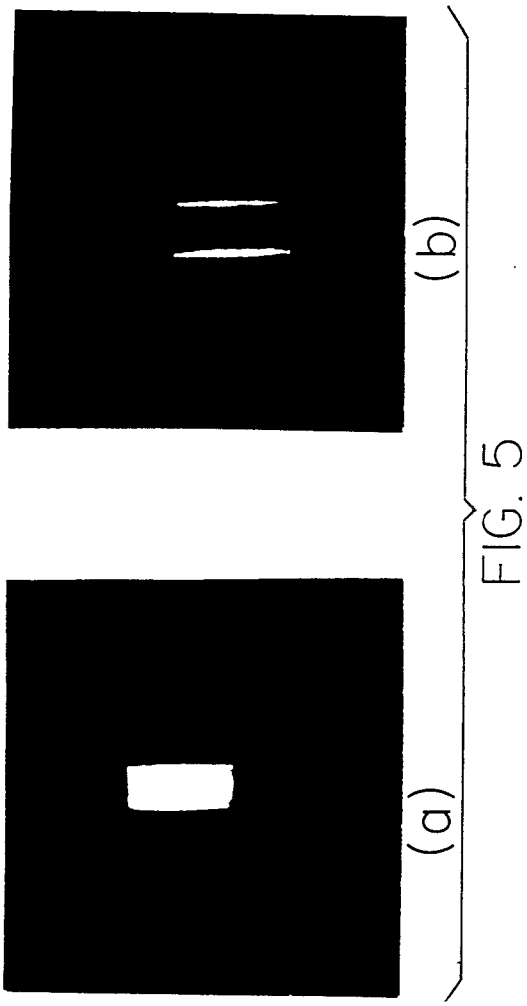
FIG. 5a illustrates the image of a rectangle after phase conjugation.
FIG. 5b illustrates the image of FIG. 5a after first order differentiation at the recombining beam splitter.

The experimental arrangement used to perform first-order differentiation, which is very similar to the experimental arrangement for FIG. 1, but with two beams 1 and 2 crossing, is shown in FIG. 4. In order to provide continuity, the same reference numerals are employed for elements common to the arrangement of FIG. 1. An image transparency T is placed not at the intersection of the two beams 1 and 2, but at some small distance from the intersection such that each beam reads a slightly shifted image of the other. The two images are then focused down into the $BaTiO_3$ crystal which, through total internal reflection, forms a self-pumped phase conjugate mirror 10. Note that while two mirrors, $M_1$ and $M_2$, are still employed, they are now deployed to cause both beams to cross and pass through the same transparency, but offset by $\Delta x$ as noted above, and the lens $L_2$ is again used to focus the two beams to overlap completely inside the poled $BaTiO_3$ crystal aligned to form the PPCM. The phase conjugate images are thus phase locked and can recombine at the beam splitter $BS_1$, giving an output amplitude which is proportional to the first order differential. Results are given in FIGS. 5a and 5b. FIG. 5a shows a rectangle image from the transparency $T_1$ after phase conjugation i.e., without the beam splitter $BS_1$, to detect only the beam 2, and FIG. 5b shows the image of FIG. 5a after first order differentiation $\partial/\partial x$ by this technique.

Figure 6A:
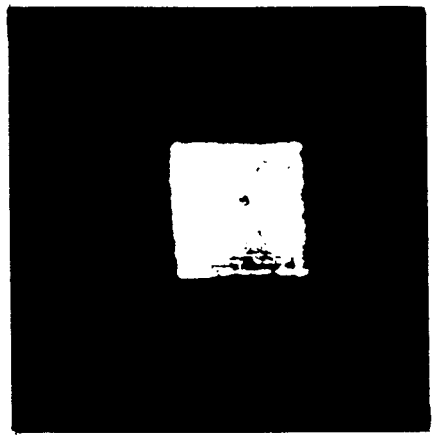
FIG. 6a illustrates the image of a square after phase conjugation.
Figure 6B:
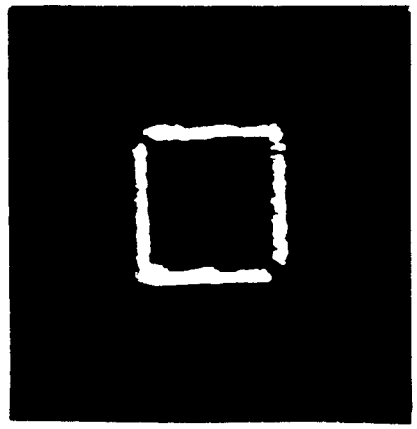
FIG. 6b illustrates the image of FIG. 6a after summing first order differentiation with respect to the x and the y axis obtained by shifting the images by $\Delta x$ and $\Delta y$.

FIG. 6a shows a square image from the transparency $T_1$ after phase conjugation and FIG. 6b shows the differential $(\partial/\partial x + \partial/\partial y)$ obtained by shifting the beams through the image transparencies by $\Delta x + \Delta y$.

Figure 6C:
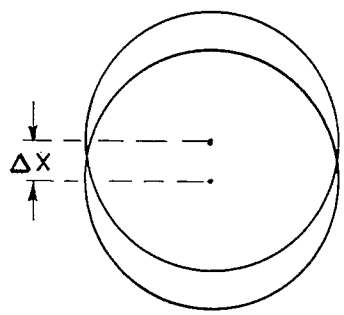
FIGS. 6c and 6d illustrate the way the images are shifted by $\Delta x$ and $\Delta y$.
Figure 6D:
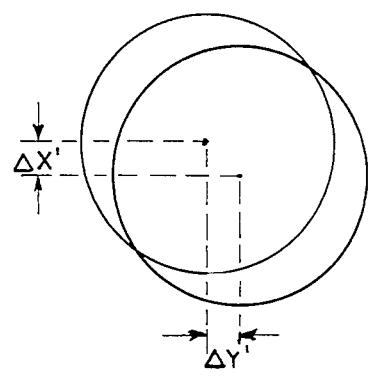

Shifting the image for beams 1 and 2 by $\Delta x$ and $\Delta y$ is achieved in the following way. First position the transparency $T_1$ at a position displayed from the crossing point of the two beams to provide a displacement placement $\Delta x$ between them on the transparency, as shown in FIG. 6c, where the axis of the beam 1 is represented by a dot in the center of that beam, and the displacement is indicated by the distance between a dot in the center of beam 2. Then to displace the two beams at the transparency by a distance $\Delta y$ in the plane of the transparency, rotate the beam splitter $BS_1$ and the position of the mirror $M_2$ about the axis of the beam 1 as shown in FIG. 6d, and adjust the position of the lens $L_{12}$.

Figure 7:
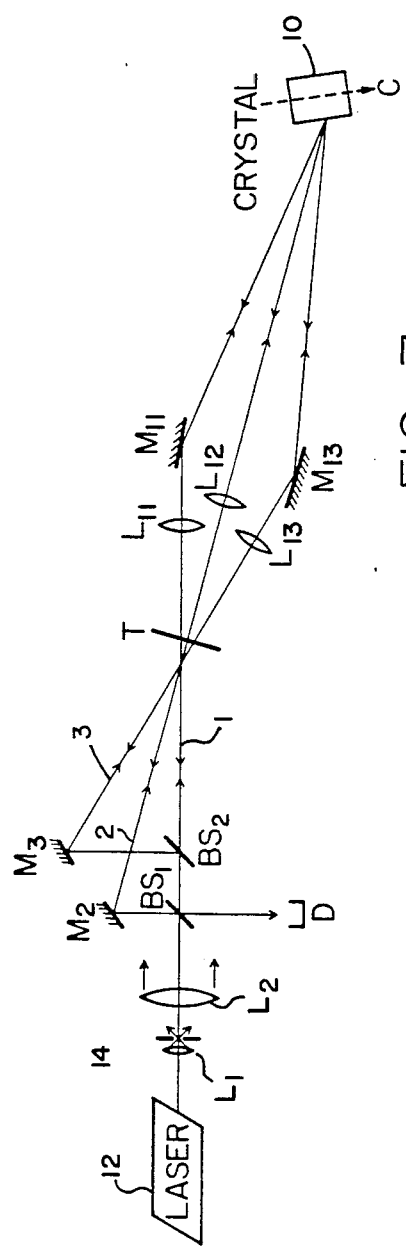
FIG. 7 illustrates an arrangement for second order image differentiation utilizing two beam splitters to form three beams which cross at a point and displacing the image transparency from the crossing point so that beams on each side of a central beam will read $T(x+\Delta x,y)$ and $T(x-\Delta x,y)$ while the center beam reads $T(x,y)$.

Second-order image differentiation is also possible. FIG. 7 illustrates an arrangement for second-order image differentiation. It is the same as for the arrangement of FIG. 6 for a first-order image differentiation, and so the same reference numerals are used for the elements common to both in the processing of beams 1 and 2. It is the processing of a beam 3 on the outside opposite beam 1 that is added. The two outside beams 1 and 3 read $T(x+\Delta x,y)$ and $T(x-\Delta x,y)$, while the center beam 2 reads $T(x,y)$. Reading $T(x-\Delta x,y)$ with beam 3 is achieved by positioning the mirror $M_3$ on the opposite side of the axis of beam 2 from beam 1 by the same angle. This yields a $\Delta x$ of a sign $(-)$ opposite the $\Delta x$ from beam 1 with respect to beam 2. The reflectivity of beam splitter $BS_2$ is 50%, giving an output amplitude at $BS_1$ proportional to the second-order differential.

$$I_{out} \propto [|T(x+\Delta x,y)|^2 + |T(x-\Delta x,y)|^2 - 2|T(x,y)|^2]^2 \quad (9)$$

Figure 8:
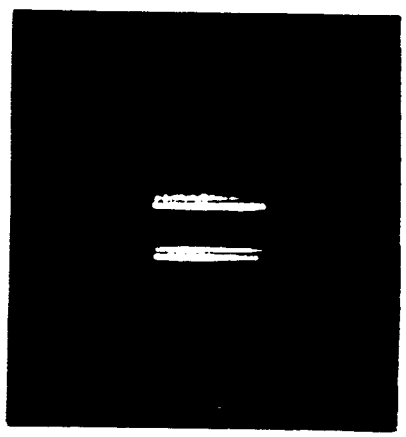
FIG. 8 illustrates the image of a rectangle as shown in FIG. 5a after second order differentiation.

Results are shown in FIG. 8 of a rectangle.

Although particular embodiments of the invention have been described, it is evident that the underlying techniques for computing and processing images may be used as subsystems of a larger system embodying combinations of the various underlying techniques. For example, extensions to higher order image differentiation can be obtained by adding up appropriately shifted images in groups, the sums of which are then subtracted at the final beam splitter. While the final beam splitter reflectivity can be arbitrary, the remaining ones must have their reflectivities chosen to perform the image additions in the correct proportions. The many shifted images required for higher order derivatives may cause difficulties in focusing all the images into a single crystal. In that case, two or more crystals phase locked through spontaneous oscillations could be used to handle the many images. Another possibility is to couple the multiple images into a single PPCM crystal using a single optical fiber by focusing all beams onto the input end of the optical fiber.

As another example, using methods similar to those shown for image differentiation, a device can be constructed whose output amplitude is proportional to the Laplacian function $\nabla^2 I(x,y)$, where $I=|T(x,y)|^2$. Once a beam is expanded and split into two beams, one of the beams can be used to read $T(x,y)$ while the other beam is split into four beams of equal intensity using 50% beam splitters. These four beams can then be used to read images of $T(x,y)$ shifted by $\pm\Delta x$ and $\pm\Delta y$. After retroreflection by PPCM, these beams will then recombine at the first beam splitter giving an output proportional to $\nabla^2 I(x,y)$, where $\nabla^2$ is a Laplacian operator. Consequently, it is intended that the claims be so interpreted as to include application of the techniques described with reference to particular embodiments to such other more complex systems.

What is claimed is:

1. A method for real-time optical image processing using a phase conjugate mirror comprising the steps of generating a beam of coherent light, splitting said beam into two beams of substantially equal magnitude by subjecting said beam to reflection of approximately half of the beam with a coefficient of reflection R and transmitting the remaining part of said beam with a coefficient of transmission T, directing both split beams to said phase conjugate mirror to reflect each split beam back on itself without phase shift, placing an image transparency in the path of at least one split beam, combining said split beams interferometrically upon subjecting one split beam with a coefficient of transmission t and the other split beam with a coefficient of reflection r in the reverse beam splitting order, thereby introducing a phase shift of 180° between the complex image fields of said split beams, whereby upon recombining the beams form an image that is the difference between the image fields of said split beams recombined, and detecting the intensity of said split beams combined interferometrically.

2. A method as defined in claim 1 wherein an image transparency is placed in the path of both split beams, whereby an "exclusive or" of the images in said transparencies is achieved.

3. A method as defined in claim 1 wherein an image transparency is placed in the path of only one split beam, whereby inversion of the image in said transparency is achieved.

4. A method as defined in claim 1 or 2 including image addition by detecting the intensity of an image beam subjected to the coefficient of reflection to and from said phase conjugate mirror added to the other beam subjected to the coefficient of transmission to and from said phase conjugate mirror.

5. A method as defined in claim 1 wherein said split beams are caused to cross while still being directed to said phase conjugate mirror to reflect each split beam back on itself without phase shift, and said image transparency is placed at a small distance from a crossing point of said beams such that each beam is transmitted through said image transparency offset by a small distance $\Delta x$ in an axis x, whereby the output amplitude of said beams, upon being recombined differentially, provides a first order differential of the image stored in said transparency.

6. A method as defined in claim 4 wherein one of said beams transmitted through said image transparency is shifted by $\Delta x$ and $\Delta y$ with respect to the other beam, where $\Delta y$ is a small distance along an axis normal to the x' axis, whereby a first order differential $\partial/\partial x + \partial/\partial y$ of the image stored in said transparency is obtained.

7. A method as defined in claim 4 wherein one beam is split again to produce a third beam, and said third beam is directed to cross at the same point as the first two beams while still being directed to said phase conjugate mirror, whereby two outside beams through said image transparency read $T(x+\Delta x,y)$ and $T(x-\Delta x,y)$ while the center beam reads $T(x,y)$ of the image stored in said transparency, and the amplitude of said beams, upon being recombined differentially, provides a second order differential of the image stored in said transparency.

* * * * *